A. E. BROADBERRY.
GAS LIGHTING AND EXTINGUISHING APPARATUS.
APPLICATION FILED MAR. 21, 1908.

942,772.

Patented Dec. 7, 1909.
8 SHEETS—SHEET 6.

Witnesses

Inventor
Arthur E. Broadberry
By
James L. Norris

A. E. BROADBERRY.
GAS LIGHTING AND EXTINGUISHING APPARATUS.
APPLICATION FILED MAR. 21, 1908.

942,772.

Patented Dec. 7, 1909.
8 SHEETS—SHEET 7.

Witnesses:

Inventor
Arthur E. Broadberry
By
James L. Norris

UNITED STATES PATENT OFFICE.

ARTHUR EDWARD BROADBERRY, OF LONDON, ENGLAND.

GAS LIGHTING AND EXTINGUISHING APPARATUS.

942,772. Specification of Letters Patent. Patented Dec. 7, 1909.

Application filed March 21, 1908. Serial No. 422,500.

*To all whom it may concern:*

Be it known that I, ARTHUR EDWARD BROADBERRY, a subject of the King of Great Britain, residing at London, England, have invented certain new and useful Improvements in Gas Lighting and Extinguishing Apparatus, of which the following is a specification.

This invention relates to that class of apparatus for lighting and extinguishing the gas flame of street or like lamps by the establishing of the ordinary night pressure, or by temporarily increasing the pressure of gas from the gas works, or from some suitable center or station controlling the supply of gas to all the lamps, or a certain number of lamps, each being provided with a by pass to the burner or other means for lighting same, thus dispensing with the usual method of turning on the taps or lighting each lamp separately by hand.

My invention will be fully understood by the following description aided by the accompanying drawings which show several examples by which my invention can be carried into effect, and for which purpose I will describe each example separately, but it must be understood that the main principle of my invention lies in the employment of two chambers having a rigid wall between them, and separate from each other, and in communication with one another in such a manner that with the normal or gradual increase of pressure of gas, liquid contained in a separate chamber or in one or both of the two chambers, flows at an equal rate.

In the said drawings.

Similar characters of reference denote corresponding parts throughout the several views.

Figure 1:
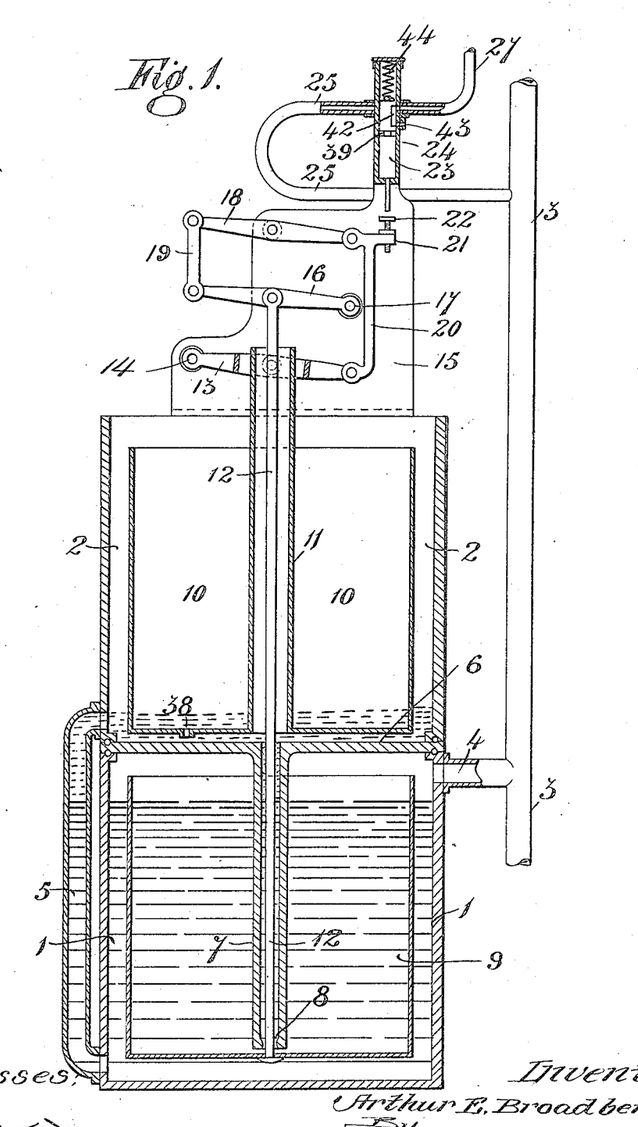
Figure 1 is a central vertical section illustrating a preferred form of pressure controlled operating apparatus.

The structure shown in Fig. 1 comprises essentially two chambers 1, 2, in this case one above the other, and I make connection from the gas supply pipe 3 which leads from the main to the burner, with the chamber 1 by a branch 4, the branch 4 being preferably situate at the upper part of the chamber 1, and I connect the lower parts of each chamber by a pipe 5. Depending from the division plate 6 which divides the two chambers 1, 2, is a tube 7, this opening into both chambers 1 and 2, the lower end of the tube 7 reaching well down into the chamber 1, and provided at its end with a contracted or contractible opening 8, so that the bore is or may be made small to retard the flow of liquid. In each of these chambers, I arrange an open topped float 9, 10, the float 10 being provided with a tube 11 passing through same from the bottom, and open at both ends. The float 9 carries a rod 12 which passes through the tubes 7 and 11. The tube 11 is pivotally connected with a rocking beam 13, hinged at 14 to a bracket 15 situate above the upper chamber 2, and the rod 12 is pivotally connected to another rocking beam 16 also hinged at 17 to the bracket 15, but on the opposite side to the hinge 14. The bracket also carries a rocking beam 18, which is connected at one end by a toggle link 19, with the rocking beam 16, and at the other end by a link 20, with the rocking lever 13, the object of this connection being to insure that the floats 9 and 10 act as counterbalances to each other, and as they move away from or toward each other assisted by the liquid in both chambers 1 and 2, their effort is assimilated and combined.

The link 20 carries an arm 21, preferably provided with an adjustable screw stop 22, which acts on a piston valve 23, situate in a cylinder 24, connecting a branch 25, from the gas pipe 3 with a chamber 26 by a pipe 27.

The chamber 26 is provided with a flexible diaphragm 29 carrying a rod 30, which passes through a guide 31 fitted in the top of the chamber 26, the end of the rod being pivoted to an arm 32 which is loosely connected to the plug of the gas tap controlling the burner 33, and said arm is provided with a pawl 34 for engaging teeth of a ratchet wheel 35, rigidly fixed to the plug of the gas tap. The plug casing 36 also carries a pawl 37 which also engages the teeth of the ratchet wheel 35 to prevent reverse motion. The float 10 is also provided with a hole 38 of a predetermined size, or regulatable by any form of valve, so as to allow the liquid to enter the float 10 as hereafter described.

The piston 23 is provided with a groove 39, for establishing connection between the pipes 25 and 27, and the upper part is provided with a groove 42 communicating with the pipe 27, and a vent 43. A spring 44 or its own gravitation keeps the piston 23 in the normal condition as shown.

The chamber 1 and float 9 are supplied with glycerin, water, or other like medium, as will be seen in Fig. 1.

With this construction of apparatus, the action is as follows:—Supposing the gas be on and the burners lighted, the various operating mechanism would be in the position shown at Figs. 1 and 2, the float 10 and diaphragm 29 being down, and the counterbalancing float 9 up, the gas passing directly through the pipe 3 to the burner 33, but the gas pressure having forced part of the liquid into the upper chamber 2 and into the float 10 by way of pipes 5 and 7 and holes 8 and 38 as shown. Now supposing it is desired to extinguish the lamp, the gas is given a comparatively quick increase of pressure from the works or station, and in consequence the pressure in the supply pipe 3 is increased, this pressure also passing through the branch 4 into the chamber 1, where it acts on the water contained therein, and further forces same up the pipe 5 in somewhat large volume into the chamber 2, and in smaller volume up into the chamber 2 through the small opening 8 and tube 7 at the same time by its action pressing down the float 9. As the water rises in the chamber 2 it lifts the float 10, a small portion passing through the hole 38 into same. This movement of the floats 9, 10, due to the displacement of the water through the increase of pressure will, through the levers 13, 16, 18, lift the lever 20, and this lifts the piston 23 so that its groove 39 corresponds to the pipes 25 and 27, to allow of the gas under the increased pressure from the pipe 25 to pass through the groove 39, through pipe 27 to the chamber 26, and acting upon the diaphragm 29, lifts it for its rod 30 to turn the gas valve or plug, by the pawl 34 engaging the teeth of the ratchet wheel 35 and so shut off the gas supply to the burner. When sufficient liquid enters the float 10 through the hole 38, and sufficient leaves float 9 through the hole 8, the operating appliances will resume their normal positions, because the float 10 being normally slightly heavier and made still heavier by the weight of liquid which has entered through hole 38, will raise its counterbalance float 9 made lighter by the liquid which has passed up through hole 8, and the spring 44 or its own gravity will bring down the piston valve 23, so that the groove 42 will be again in communication with the pipe 27 and the vent 43, and the gas under the diaphragm 29 will be vented and allow the diaphragm 29 to lower by its own weight or otherwise, the pawl 34 traveling over the teeth of the ratchet wheel 35 for a fresh operation.

In normal condition, the pipe 25 is closed by the piston 23.

To relight the gas burner, a repetition of the operations is performed by establishing again a comparatively quick increase of pressure, which in the meantime may have been slowly varied either up or down, without affecting the apparatus which constantly adapts itself to the varying conditions by the liquid equalizing through the holes 8 and 38.

The appliances will not be actuated by a gradual increase of pressure, as in such an event, the liquid will rise in chamber 2 and fall in chamber 1 slowly, and in consequence, will not operate the floats 9 and 10 appreciably, because the liquid equalizes in each chamber and float gradually through holes 8 and 38. In this connection it should be stated that the chambers 1 and 2 are common to the several forms of pressure controlled operating apparatus and that the numerals designating said chambers and their various adjuncts, no matter what their arrangement may be, are the same throughout the several figures in order that the analogy between the several corresponding parts of the different structural arrangements may be clear.

Figure 3:
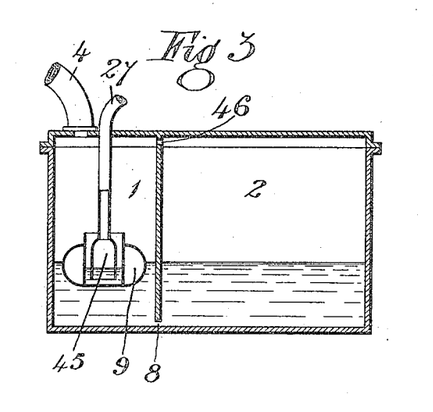
Fig. 3 is a central vertical section illustrating a modified form of pressure controlled operating apparatus.
Figure 4:
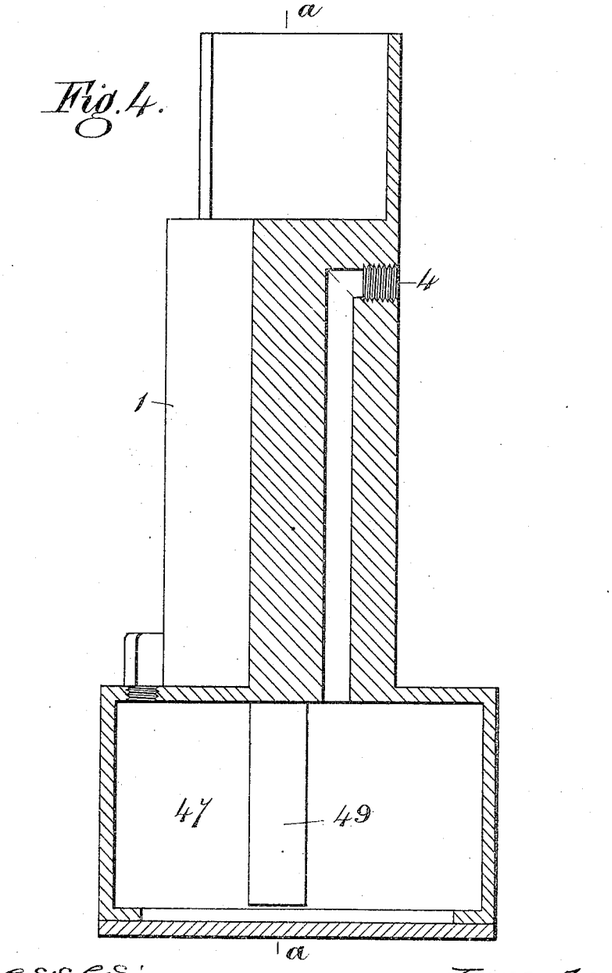
Fig. 4 is a central vertical section illustrating a further modified form of pressure controlled operating apparatus.
Figure 5:
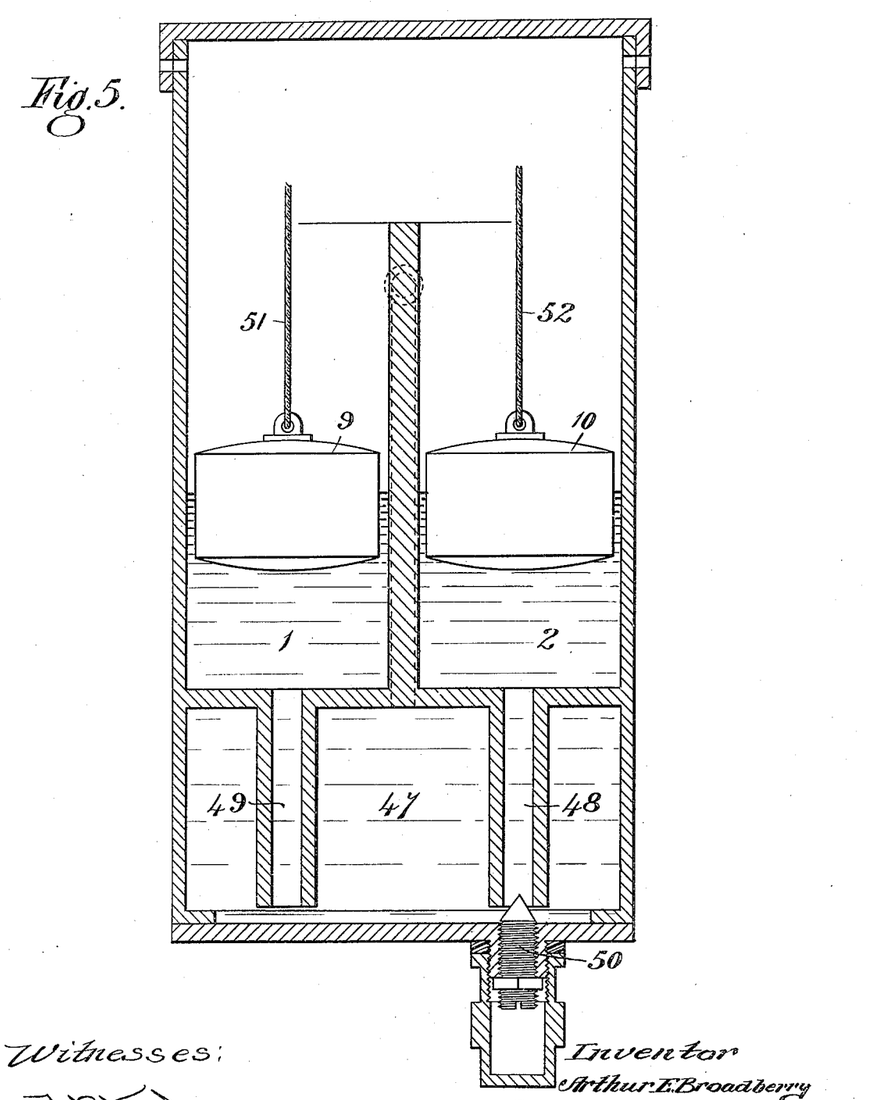
Fig. 5 is a central vertical section on the line *a—a* of Fig. 4.
Figure 6:
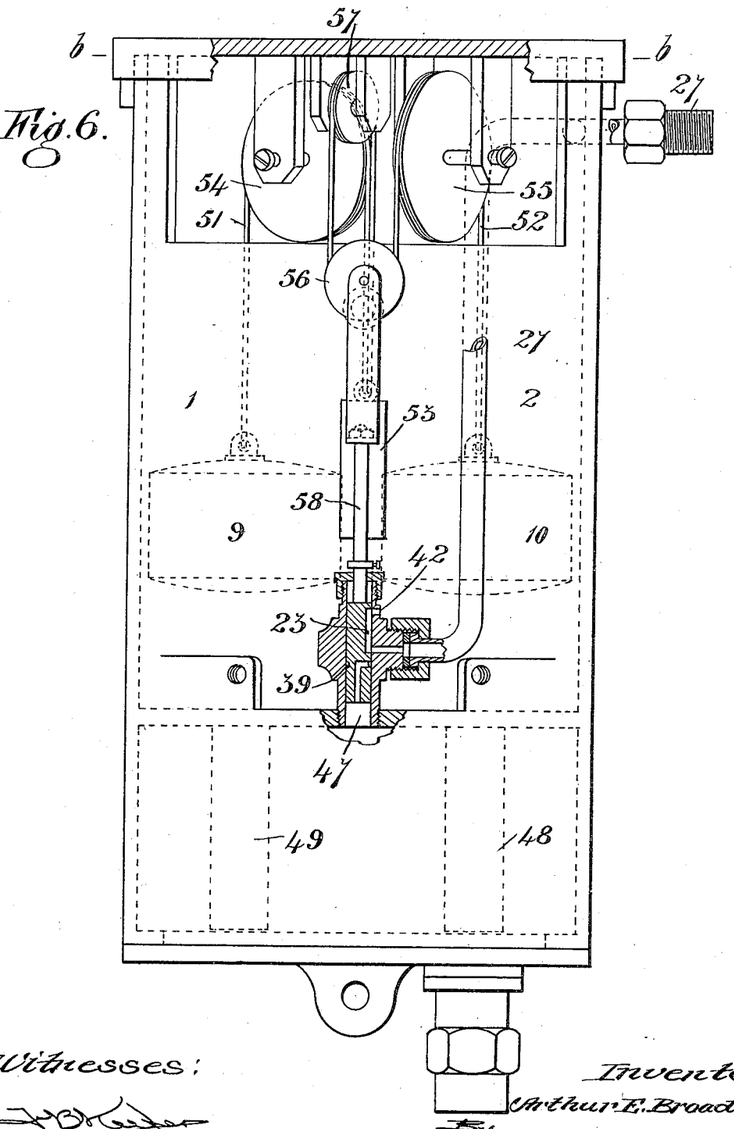
Fig. 6 is an elevation partly in section of the apparatus shown in Figs. 4 and 5.
Figure 7:
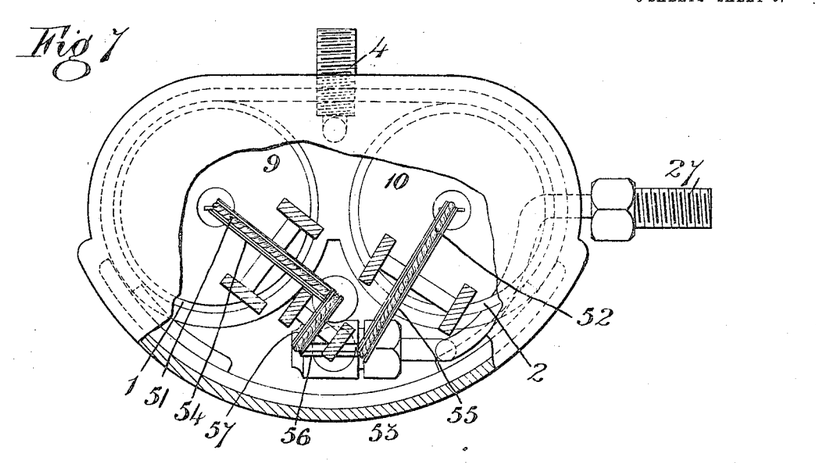
Fig. 7 is a top plan view of such apparatus, partly in horizontal section on the line *b—b* of Fig. 6.

In Fig. 3, I have shown duplex chambers 1, 2, arranged side by side and connected by an opening 8 between them. In this case, I only use one float 9, which consists of a tubular vessel carrying a sealing medium, such as mercury or glycerin, into which the mouth 45 of the pipe 27 is immersed, the mechanism operated by the float being dispensed with, or in place of a mercury seal valve I may use a piston or other valve.

Figure 2:
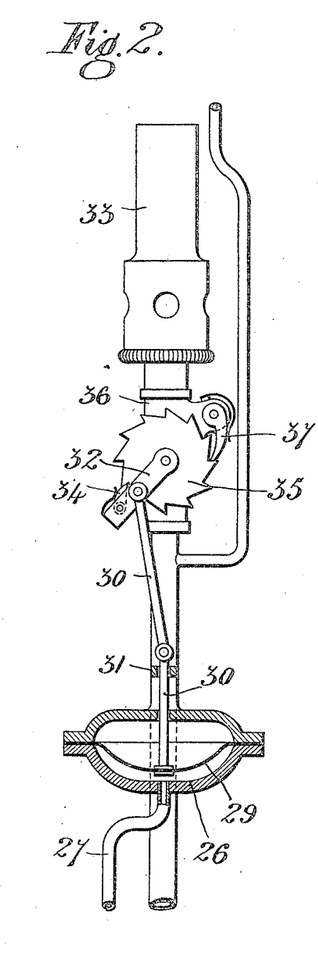
Fig. 2 is an elevation, partly in section, illustrating a preferred form of mechanism for positively operating the valve which controls the supply of gas to the lamps.

In action, the quick rise of pressure of gas, in addition to acting on the water to displace it in the chamber 1, will also act upon the float 9 and force it down, and in so doing unseal the mouth 45 of the pipe 27 to allow the gas to flow to the diaphragm 29 to operate the gas cock or plug, as in the construction shown in Figs. 1 and 2, as will be readily understood, and the pressure of gas in the chambers 1 and 2 will gradually equalize through a regulated hole 46.

In the construction shown in Figs. 4 to 7 I employ three chambers, so that the displacement of water in one chamber can effect the different movements of the floats in the other two chambers.

47 is a chamber containing the liquid, and this chamber is situate under the other two chambers 1 and 2, pipes 48 and 49 depending from each chamber 1, 2, into the chamber 47, the entrance to the pipe 48 from the chamber being regulated by a screw valve 50.

The floats 9 and 10 are of the hollow body formation, and are connected by cords 51 and 52 to a weight 53, the cord 51 being rove over a pulley 54 and being directly connected to the weight 53, while the cord 52 is first rove over a pulley 55, then around a loose pulley 56, then over a pulley 57, before reaching the weight. The loose pulley 56 carries a rod 58 connecting the piston 23 controlling the supply of gas from the chamber 47 or from a branch of supply pipe 3 to the pressure controlled device 29 which causes the opening and closing of the gas pipe valve.

The gas from the supply pipe passes into the chamber 47, and when at normal pressure, the flow of liquid through the pipes 48 and 49 is equal so that both floats are equally acted upon, but when a moderately quick extra pressure is established, the water is forced in greater volume up the pipe 49 into the chamber 1 acting upon the float 9 and, the weight 53 being no longer held by float 9 falls, pulling upon cord 52, and lifting the loose pulley 56, and with it the piston valve 23 to establish the pressure supply to the bell float as in the other constructions. When the liquid becomes equalized in both chambers 1 and 2, the float 10 by rising will slacken cord 52 and allow the piston 23 to drop, the piston establishing the vent to release the diaphragm 29, and allow the pawl 34 to again assume its position for a fresh movement of the gas cock or plug.

Figure 8:
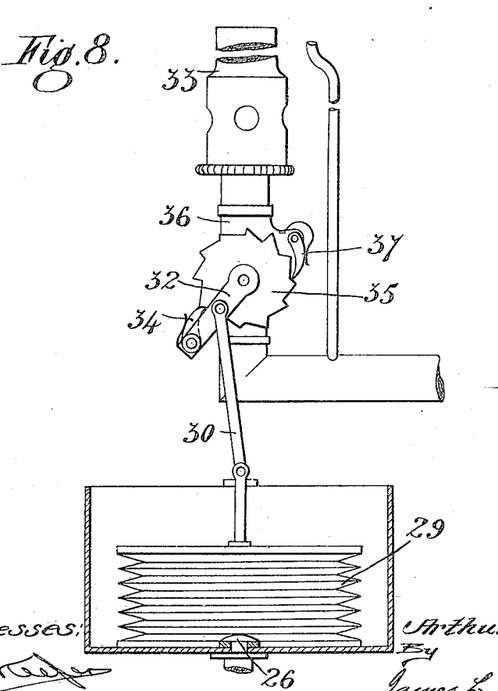
Fig. 8 is an elevation, partly in section, illustrating an alternative form of mechanism for positively operating the valve which controls the supply of gas to the lamps.

In Fig. 8, I have illustrated an alternative form of mechanism for directly operating the valve which controls the supply of gas to the lamp, a bellows 29 used instead of the diaphragm shown in Fig. 2.

Figure 9:
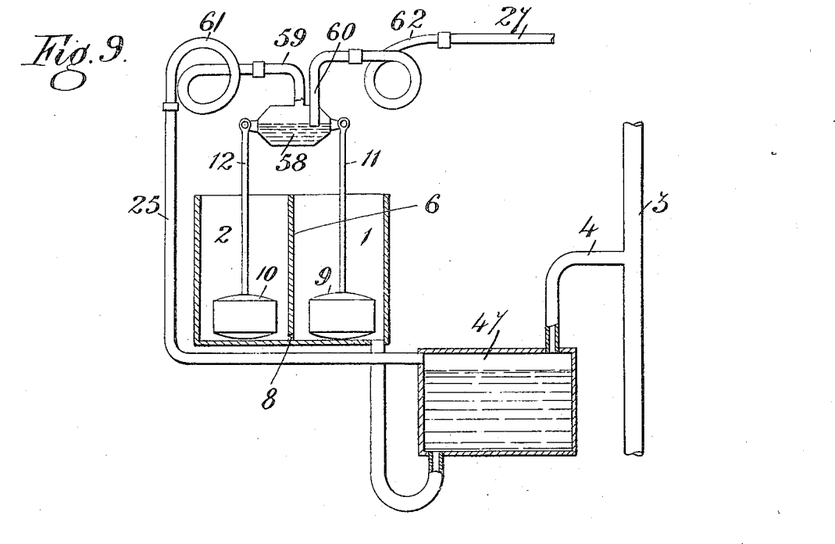
Fig. 9 is a vertical central section of a further modified embodiment of pressure controlled operating apparatus.

In Fig. 9, I have illustrated a three-chambered apparatus, the chamber 47 being supplied with liquid and connected to the chamber 1 by a pipe, the chamber 1 being in communication with the chamber 2 by a hole 8 in the division plate 6. The floats 9, 10, are provided with rods 11, 12 carrying between them a vessel 58, this containing mercury and connected by tubes 59, 60, the tube 60 depending well into the vessel 58 and in the normal condition becoming sealed by the mercury. The tubes 59 and 60 are connected by flexible tubing 61, 62, to the pipes 25 and 27 respectively. In this construction, the rising of the float 9 more quickly than the float 10 will tilt the mercury vessel 58 and unseal the tube 60, so that the gas can flow through the vessel 58 to the pipe 27, and away to the diaphragm 29 to operate the gas cock as in the other constructions, the mercury sealing the pipe 60 when the floats become equalized by the passage of liquid through the hole 8.

Figure 11:
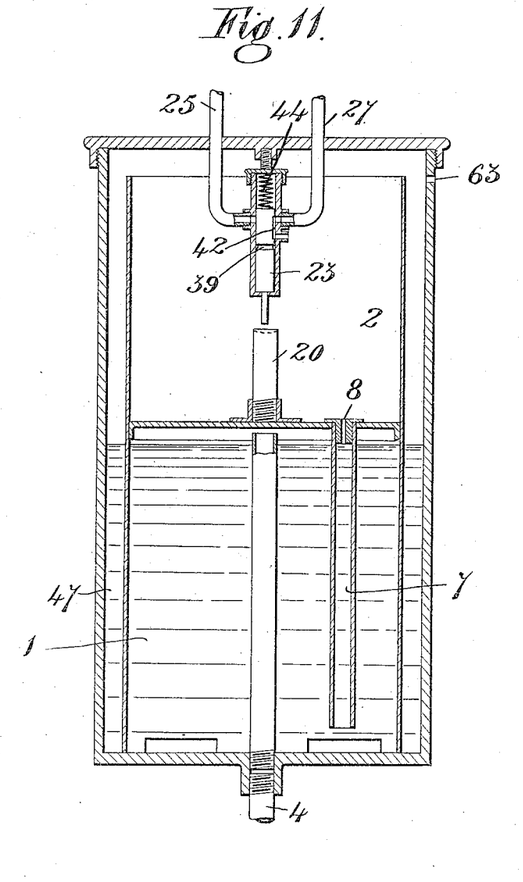
Fig. 11 is a vertical central section of a further modified embodiment of pressure controlled operating apparatus.

In the construction shown in Fig. 11, I form the two chambers 1 and 2 as a bell contained in a receiver or liquid vessel 47, the lower chamber 1 having a depending pipe 7 contracted at the top at 8. The double chambers 1 and 2 are of a weight sufficient to resist the normal pressure of gas and not to be moved during any gradual increase of pressure, the pressure of gas only forcing the water through the orifice 8 so that the water can flow from the chamber 1 into the chamber 2, but in the event of a quick pressure, the double chambers 1 and 2, will be raised, and the rod 20 (equivalent to the link 20) will operate the piston 23 to establish a supply of gas between the pipes 25 and 27, in the same manner as at Figs. 1 and 2.

The communicating hole or holes between the two floats or chambers or between the chambers, or between the chambers and floats are always of a size that when the gas is at normal or slowly increasing pressure, the flow of water or gas is equal in all parts of the apparatus.

Figure 10:
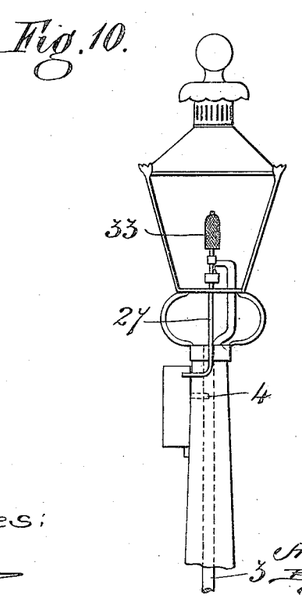
Fig. 10 is an elevation showing, conventionally, one form of the apparatus as applied to an ordinary street lamp.

In Fig. 10, I have illustrated conventionally the pressure controlled operating apparatus as applied to an ordinary street lamp, this figure showing the relation of the pipe 4 to said apparatus and to the lamp.

What I do claim and desire to secure by Letters Patent is:—

1. In a gas lighting and extinguishing apparatus, in combination, a gas lamp, a gas supply pipe, a valve in the supply pipe and controlling the supply of gas to the lamp, valve operating means including a pressure operated element, and means for causing the operation of the valve operating means and comprising a gas receiver, a connection between the gas receiver and the supply pipe, a connection between the supply pipe and the pressure operated element, a valve controlling the last named connection and normally closing the same, a float controlling the operation of the last named valve and resting in a body of liquid in the gas receiver and means having a constricted aperture in communication with the space in which the body of liquid is confined whereby slight and gradual pressure variations are without substantial effect on the float but whereby a sudden and material increase in the pressure will cause a corresponding change in the position of the float to cause the latter to open the last named valve.

2. In a gas lighting and extinguishing apparatus, in combination, a gas lamp, a gas supply pipe, a valve in the supply pipe and controlling the supply of gas to the lamp, valve operating means including a pressure operated element and means for causing the operation of the valve operating means and comprising a gas receiver having two chambers and a partition separating the chambers and having a constricted opening affording communication therebetween, a connection between the supply pipe and the pressure operated element, valve means controlling the connection, a float in each chamber and resting on a body of liquid therein, means connecting the floats and the valve means whereby the latter is operated by movement of the former and means connecting the supply pipe and one of the chambers.

3. In a gas lighting and extinguishing apparatus, in combination, a gas lamp, a gas supply pipe, a valve in the supply pipe and controlling the supply of gas to the lamp, valve operating means including a pressure operated element and means for causing the operation of the valve operating means and comprising a gas receiver having two liquid containing chambers associated therewith, means separating said chambers and having a constricted opening affording communication therebetween, a connection between the supply pipe and the pressure operated element, valve means in the connection, a float in one of the chambers and having operative movement in accordance with a variation in the level of the liquid in said chamber, means connecting the float and the valve means whereby the operative movement of the former causes the opening of the latter and a connection between the supply pipe and one of the chambers.

4. In a gas lighting and extinguishing apparatus, in combination, a gas supply pipe, a casing for maintaining a body of liquid in communication with the supply pipe, a partition in the casing and provided with a constricted opening in communication with the space in which the body of liquid is confined, an operating element in the casing and arranged to be operatively moved upon any sudden increase in the pressure of the gas of such degree that the liquid flowing through the constricted opening can not wholly compensate therefor, a lamp receiving gas from the supply pipe, a lamp valve controlling the flow of gas to the lamp, pressure operated means for operating the lamp valve, a by-pass connection between the supply pipe and the pressure operated means, a by-pass connection valve and an operative connection between the operating element and the by-pass connection valve.

5. In a gas lighting and extinguishing apparatus, in combination, a supply pipe, a valve controlling the flow of gas therethrough, valve operating means including a movable pressure controlled element, a by-pass connection between the supply pipe and the pressure controlled element, a second valve controlling the flow of gas through the by-pass connection and an element arranged to be operatively moved upon a sudden and material variation of the pressure in the supply pipe for causing thereby the operative movement of the second valve.

In testimony whereof I have hereunto set my hand in presence of two subscribing witnesses.

ARTHUR EDWARD BROADBERRY.

Witnesses:
ALFRED NUTTING,
PERCY PHILLIPPS.